United States Patent [19]

Brobeck

[11] 4,112,785
[45] Sep. 12, 1978

[54] RING ASSEMBLY FOR INERTIAL ENERGY STORAGE ROTOR

[75] Inventor: William M. Brobeck, Orinda, Calif.

[73] Assignee: Electric Power Research Institute, Inc., Pala Alto, Calif.

[21] Appl. No.: 701,826

[22] Filed: Jul. 1, 1976

[51] Int. Cl.² ............................................. F16C 15/00
[52] U.S. Cl. ......................................... 74/572; 310/74
[58] Field of Search ................ 74/572, 573 R, 573 F, 74/574; 310/67, 74; 403/319, 355, 365

[56] References Cited

U.S. PATENT DOCUMENTS

| 1,272,061 | 7/1918 | Lake ........................................ 74/574 |
| 2,539,730 | 1/1951 | Defosse ................................... 74/572 |

*Primary Examiner*—Stephen C. Bentley
*Attorney, Agent, or Firm*—Townsend and Townsend

[57] ABSTRACT

An inertial energy storage rotor defined by a plurality of independent, concentric rotor ring assemblies rotatable about a vertical axis. Each assembly has at least two co-axial rings and a plurality of circumferentially spaced apart, U-shaped clamps which secure the rings of the assembly to each other. Opposing end faces of the rings include a plurality of circumferentially spaced apart, opposing grooves which define between them radially oriented apertures. The clamps include radially inwardly and radially outwardly extending plugs which are shaped complementarily to the configuration of the holes in the adjacent inner and outer ring assemblies and which concentrically interconnect adjacent ring assemblies. The plug extending radially inward and disposed in the hole of the ring assembly inward of the clamp has a tapered configuration in a radial plane of the ring assembly. The taper is chosen so that axial movements of the U-shaped connector and its plugs due to the relatively larger dilation of the outer ring assembly during high speed rotation of the rotor results in a continued engagement between side walls of the inwardly oriented plug and the corresponding sides of the hole.

23 Claims, 7 Drawing Figures

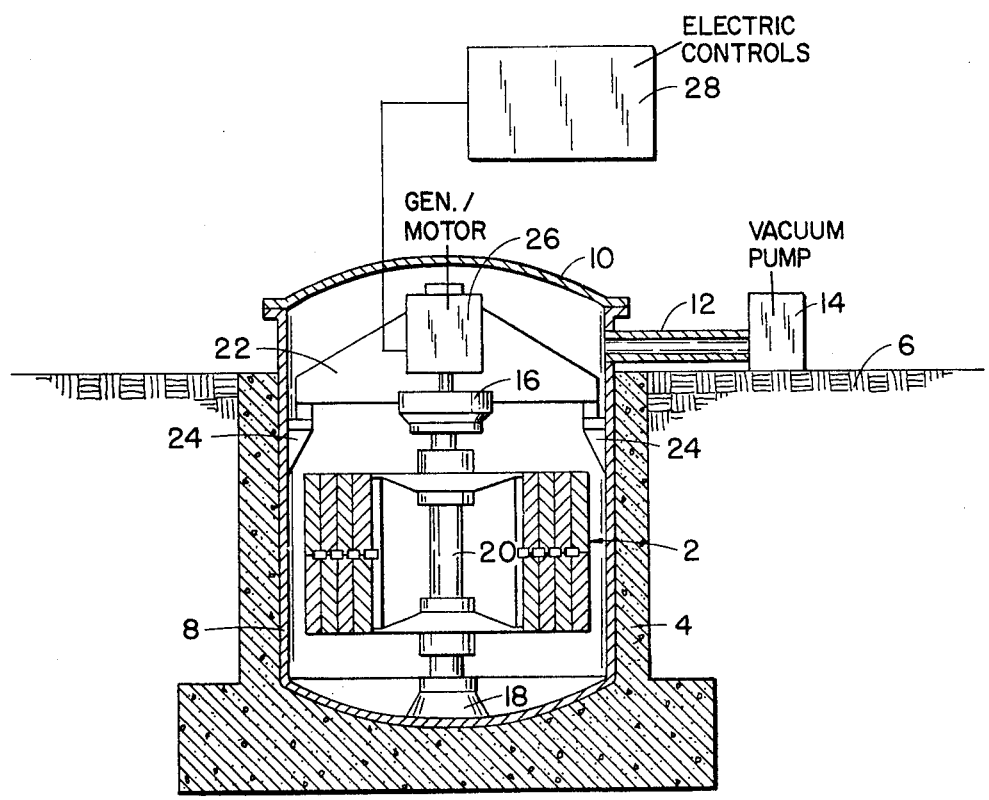
FIG._1.
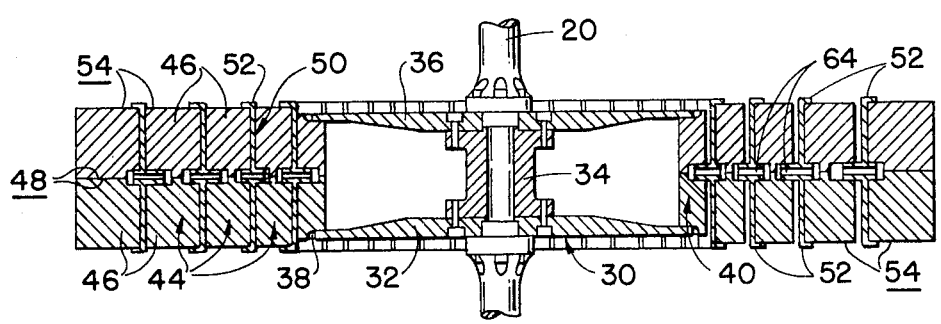
FIG._2.

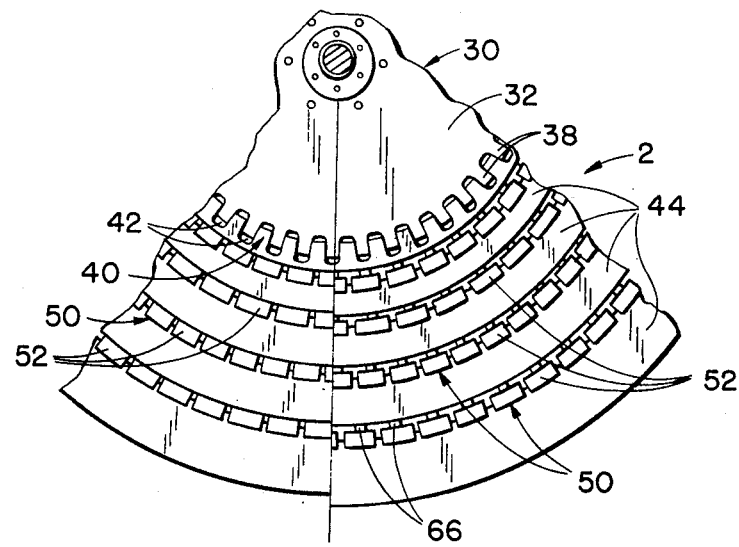
FIG._3.
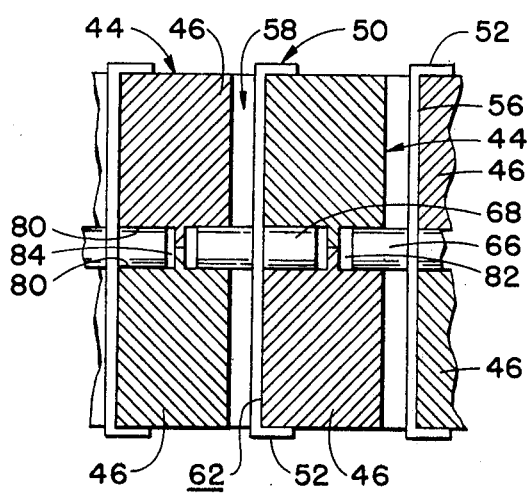
FIG._4.
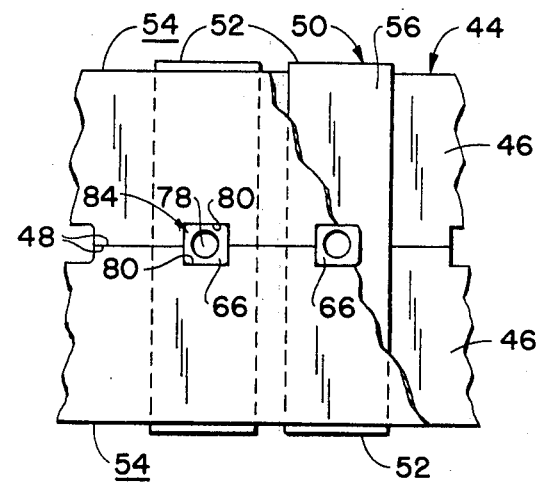
FIG._5.

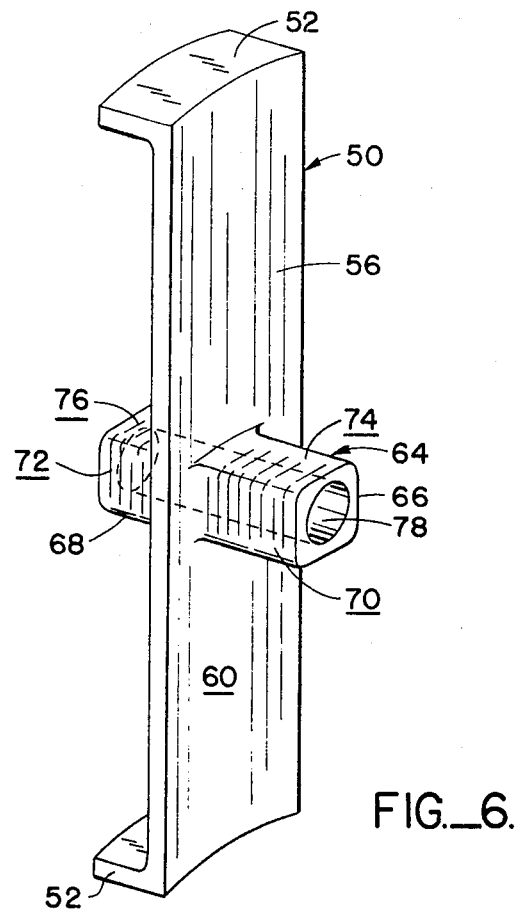
FIG._6.
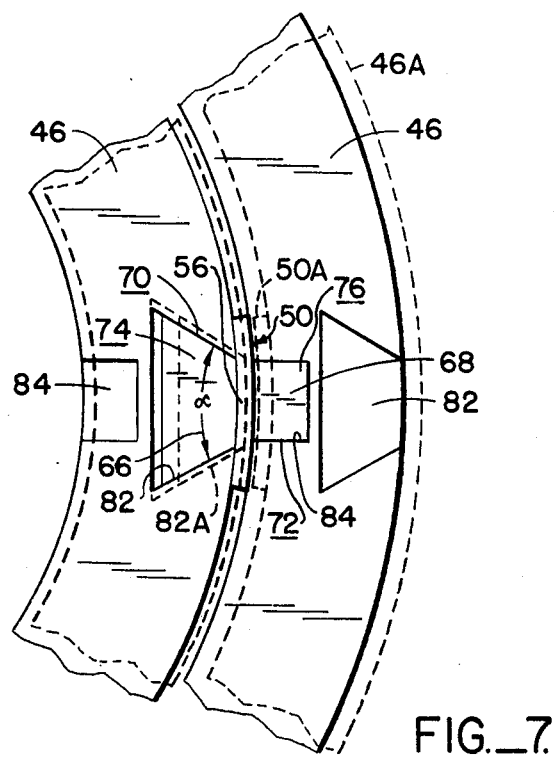
FIG._7.

RING ASSEMBLY FOR INERTIAL ENERGY STORAGE ROTOR

BACKGROUND OF THE INVENTION

Today's energy shortages make it increasingly necessary to store energy which becomes available during periods of relatively low energy demand for use during peak demand periods. For example, solar energy is readily available during relatively low day time demand periods but is frequently unavailable during the peak evening hour demand periods.

It has been suggested to store excess energy with inertial energy storage wheels or rotors. Such energy storage requires that excess energy, normally electrical power, is used to drive an electrical motor-generator to spin the rotor at often very high rates of rotation. To recover the energy, the motor-generator is operated in its generator mode to generate electricity while correspondingly decreasing the rotor's rate of rotation, thereby converting the rotors inertial energy into electrical power. To store a meaningful amount of energy, the rotors have to be spun at rates as high as 20,000 rpm and more. This severely stresses the rotor and requires that it be specially constructed so that it can withstand the centrifugal forces generated by such high rates of rotation.

It is known that the stress to which a rotating ring is subjected comprises both hoop or circumferential stresses, which subject the ring material to tension, and radial stresses, which subject the material to shear.

To achieve the necessary high energy storage densities requires materials with a high strength-to-weight ratio. The materials with the highest strength-to-weight ratios currently are fiber materials such as those used for the reinforcement of plastic composites. The fiber composites, therefore, offer the potential of very high energy storage densities. Problems exist, however, due to the orthotropic properties of the ccomposites. They possess very high strength in the direction of the fibers, that is, in a circumferential direction, and very little strengh in the transverse directions, that is, in a radial direction. Thus, fiber composite materials can withstand only very limited radial forces.

A theoretical ring with no radial thickness would not be subjected to any radial stress but to hoop stresses only. Thus, to limit the radial stresses in such rings to acceptable values, their radical thickness must be relatively small. Accordingly, it has been suggested to construct inertial energy storage rotors by combining a plurality of relatively thin, concentric rings into one rotor. The rings are mounted to a concentric hub, which in turn rotates about a vertical axis. The rings are interconnected by resilient, e.g. elastomeric spacers disposed between each adjacent inner and outer ring. U.S. Pat. Nos. 3,683,216 and 3,741,034 generally describe the construction of inertial energy storage wheels constructed of a plurality of concentric rotor rings carried by a common hub. Elastomeric spacer rings connect each inner ring to its adjacent outer ring.

The spacer rings are constructed of an elastomeric material so that the rings can move relative to each other in a radial direction; that is, during rotation of the hub each outer ring expands or dilates a greater amount than its adjacent inner ring because the rate of expansion of each ring due to centrifugal forces is directly related to its mean diameter. Consequently, as the rate of rotation of the wheel increases the gaps between adjacent rings also increase. The spacer rings must accommodate this differential expansion of the rotor rings. Additionally, the spacer rings function to center the rings with respect to each other.

Under the high centrifugal forces, and the resulting large radial dilations to which rotors of the type disclosed in the above-referenced U.S. patents are subjected the use of elastomeric spacer rings between each pair of rotor rings has drawbacks. The differential radial expansion of the rings is relatively large. This severely stresses the elastomeric spacer ring. More seriously, it places a severe stress on the connection, e.g. the bond between the spacer ring and the rotor rings. In many instances, the bond, or the ring material underlying the bonded areas fails which can lead to a potentially disastrous failure of the whole ring assembly.

Additionally, the relatively large differential expansion between the rotor rings requires the use of relatively soft elastomeric materials. Material softness, or excessive flexibility of the spacer rings, however, can give rise to a dynamic instability at high rates of rotation which induces vibrations. The latter in turn can damage the rotor, the rotor shaft, or the bearings in which the shaft is journaled. Increasing the hardness or stiffness of the spacer rings, on the other hand, limits the amount of relative dilation between the inner and the outer rotor rings which can be accommodated by the spacer ring. Consequently, prior art rotor rings must be either relatively thin, which renders the rotor wheel assembly more expensive, or the rotor must be operated at a lower speed, because the spacer ring would otherwise fail due to its inability to accommodate the large relative ring dilations.

Thus, it is apparent that prior art multiple ring inertial energy storage rotor wheels have serious drawbacks which limit their potential use and which correspondingly limit the development of the otherwise highly desirable inertial energy storage wheels.

In a more recent development a metallic inter-ring spacer has been developed which has a cylindrical shape and occupies the annular space between an adjacent inner and outer rotor rings. This spacer ring is alternatively slotted from opposing ends of the ring (in a generally axial direction) so as to define a series of homogeneous, inter-connected, U-shaped spring elements arranged in cylindrical form. This inter-ring spacer supports the inner and outer ring assemblies but is not secured, e.g., bonded to either of them, transmits torque between them, and permits the outer ring to dilate a greater amount than the inner ring without unduly stressing either one of the rings, the spacer, or connections between them as was the case with the prior art rotors provided with elastomeric spacer rings.

The slotted spacer ring substantially improves prior art multi-ring rotor wheels. However, the slotted spacer ring is relatively expensive to construct, it is relatively bulky and, during high speed operation of the rotor wheel, grooves in the ring assemblies which receive radially oriented lips of the spacer ring expand slightly. Since the radial lips do not correspondingly expand, a slight amount of play can develop between the spacer ring and the adjacent rotor rings. It is, of course, of utmost importance that such play be limited as much as possible to prevent undesirable vibrations during the operation of the inertial energy storage wheel.

SUMMARY OF THE INVENTION

The present invention provides an inertial energy storage wheel constructed of a plurality of concentric interconnected ring assemblies in which each ring assembly comprises at least two co-axial rings which have like inner and outer diameters. Opposing faces of the rings include a plurality of circumferentially spaced apart, aligned grooves so that each set of corresponding grooves defines a radially oriented, open hole disposed between each set of two adjacent rings of the ring assembly. A plurality of connecting members are provided to constrain the rings of each assembly to each other. A radially oriented plug which has a cross-section complementary to the cross-section of the holes in the ring assembly is provided for and protrudes from each hole for interconnecting the assembly with the next adjacent ring assembly by extending the plug into a similarly formed hole of the adjacent ring assembly.

In the preferred embodiment of the invention, the plug member has a radially outwardly extending portion and a radially inwardly extending portion for engaging the holes in the outer and the adjacent inner ring assemblies, respectively. The outer portion of the plug has a constant cross-section over its length and it is disposed in a correspondingly shaped and dimensioned hole which snugly engages the outer plug portion so that there is no play between them when the rotor is at rest.

The inwardly extending portion of the plug is slightly tapered in a radial plane of the ring assembly so that its cross-section increases in a radially inward direction. Preferably, the inner end plug portions, have a rectangular cross-section and they include pairs of side walls which are parallel to the axis of the rings and a pair of contiguous radial surfaces which are parallel to a radial plane of the rings. The side walls of the inner plug portion diverge in a radially inward direction at an angle alpha. Corresponding sides of the hole in the inner ring assembly are complementarily shaped. While the rotor is spun the plug member is supported by the outer ring assembly, preferably by constructing the plugs homogenously with the connecting members as is more fully discussed below. Consequently, during operation of the wheel the plug moves radially outward with respect to the inner ring assembly by an amount equal to the differential dilation between the outer and the inner ring assemblies (which is a function of their respective mean diameters). Also, it should be noted, that during the operation of the rotor the ring assemblies, and specifically the inner ring assembly dilates which causes a slight circumferential expansion of the ring and, therefore, of the holes which receive the inwardly extending portion of the plug. Since the plug itself does not expand in a circumferential direction, some play can develop between the holes in the inner ring assembly and the inwardly extending plug portion.

To prevent such play from occurring the side walls of the inwardly extending plug portion (and the sides of the holes in the inner ring assembly) are tapered. The above referred to angle alpha is chosen so that the relative radial movement of the plug over a distance equal to the differential dilation between the inner and the outer ring assemblies compensates for the slight circumferential expansion of the holes in the inner ring assembly during high speed operation. As a result, the tapered side walls of the inner plug portion are always in firm contact with the corresponding sides of the hole in the inner ring assembly and no play can be developed between them during operation of the rotor.

A similar compensation for the relative circumferential expansion of the holes in the outer ring assembly is not possible. The elimination of play between the plug and the inner ring assembly, however, results in an approximately 50% reduction in the play between adjacent ring assemblies during high speed operation. Consequently, overall play between the ring assemblies and undesirable vibrations of the rotor as a whole are substantially reduced.

A complete inertial energy storage wheel constructed in accordance with the present invention therefore comprises first and second inner and outer, co-axial rotor ring assemblies each of which is defined by at least two like, axially aligned rings. The innermost rotor ring assembly is supported by a hub disc which preferably rotates about a vertical axis and which has a plurality of radially extending teeth disposed on its outer periphery and engaging correspondingly shaped grooves or the like in the lower ring of the innermost ring assembly. Means such as a clamping plate bolted to the hub disc is further provided for securing the rings of the innermost ring assembly to each other.

The above-mentioned connecting members are preferably independent, U-shaped clamps. The clamps have axially oriented center sections disposed in the annular space between adjacent ring assemblies and radially outwardly protruding lips which engage free end faces of the rings of the outer ring assembly and which thereby constrain the rings to each other. The ring assembly interconnecting plugs described above protrude perpendicularly from the center section of the clamp in respective radially outward and radially inward directions and they are disposed in radially inward and outward open holes, respectively, defined by the ring assemblies between which the clamps are disposed.

The above-described inertial energy storage wheel is assembled by securing the rings of the outermost ring assembly with the clamps to each other by inserting the outwardly protruding plug portions in the corresponding holes of the ring assembly and moving the clamps radially outward until the lips of the clamps engage the free end faces of the rings. Each successive, inwardly disposed ring assembly is assembled in a like manner and thereafter the innermost ring assembly is mounted to the hub by engaging the radial hub teeth and securing the clamping plate.

It will be apparent that the individual clamping members are not stressed, even during high speed operation of the wheel (other than negligible compressive stresses due to centrifugal forces). Furthermore, the clamps, together with the ring engaging lips and the plugs disposed in the holes of the ring assemblies, are free to move relative to the rings when the rings dilate by varying amounts due to their varying mean diameters. Consequently, no stresses develop between the rings, the U-shaped clamps and the plugs, no relative movements due to centrifugal forces are transmitted from one ring assembly to the next, and there are no bonding materials, bonding surfaces and the like which may fail due to excessive stresses and/or due to difficult to detect bonding imperfections.

Even though the clamps and the ring assembly connecting plugs are movable relative to the adjacent ring assemblies, the concentricity of the ring assemblies even during high speed operation is much better maintained than was heretofore possible because the inwardly diverging construction of the inner plug portions prevents any play between the inner ring assembly and the plugs.

In addition, the provision of independent clamps, integrally constructed with the plugs, eliminates many heretofore unnecessary complicated, close tolerance machining operations or difficult to perform bonding operations. Instead, mass producible, close tolerance U-shaped clamp members are provided which are not only simpler and less costly to manufacture but which further facilitates the assembly of the inertial energy storage wheel. Accordingly, the present invention combines a technologically superior product and performance with relatively low cost.

BRIEF DESCRIPTION OF THE DRAWINGS

FIG. 1 is a schematic, elevational view, in section, illustrating an inertial energy storage wheel installation incorporating a multiple ring rotor constructed in accordance with the present invention;

FIG. 2 is an enlarged, fragmentary, elevational view, in section, of a portion of the rotor wheel shown in FIG. 1 and in particular the lefthand portion of FIG. 2 illustrates the connection between the wheel hub and the rotor ring assemblies at rest while the righthand portion of FIG. 2 illustrates the connection between the wheel hub and the rotor ring assemblies during high speed operation;

FIG. 3 is a fragmentary end view of the inertial energy storage wheel illustrated in FIG. 2 and also consists of a lefthand portion which shows the wheel at rest and a righthand portion which shows the wheel in operation;

FIG. 4 is an enlarged, fragmentary side elevational view, in section, illustrating the connection between inner and outer rotor ring assemblies in accordance with the present invention;

FIG. 5 is a fragmentary front elevational view, with parts broken away, of the ring assembly connection shown in FIG. 4;

FIG. 6 is a perspective elevational view of a U-shaped clamp connector fitted with radially inwardly and outwardly protruding plugs constructed in accordance with the invention; and FIG. 7 is a schematic plan view which, in an exaggerated manner, illustrates the construction of the plug member so as to eliminate radial play between the inwardly extending portion of the plug member and the adjacent inner ring assembly during high speed operation of the wheel.

DESCRIPTION OF THE PREFERRED EMBODIMENTS

Referring first to FIG. 1, an installation employing an inertial storage wheel or rotor 2 constructed in accordance with the invention is schematically illustrated. The rotor is disposed in a concrete housing 4 in ground 6 and lined with an impact resistant material such as steel defining an airtight, upwardly open tank 8 closed by a cover 10. A fluid conduit 12 connects the interior of the tank with a vacuum pump 14 for evacuating the interior of the tank to as low a pressure as one-tenth millitorr.

Mounted within tank 8 are upper and lower bearings 16 and 18 which journal a rotor shaft 20 for rotation about a vertical axis. The upper bearing is supported by a spider 22 carried on pedestals 24 which protrude from the inner wall of tank 8. The spider also supports a generator-motor 26 which is suitably coupled to rotor shaft 20 and which is controlled by electric controls 28 so that it can alternatively be operated in its generator or its motor mode for alternatively converting inertial energy of the rotating wheel 2 into electricity or for converting electricity into inertial energy by correspondingly increasing the rate of rotation (hereinafter sometimes referred to as "rotation") of the wheel. The detailed construction of the electric controls 28 is well-known to those skilled in the art and, therefore, is not further described herein.

Referring now to FIGS. 1-6, rotor 2 comprises a hub 30 rigidly mounted to shaft 20 and defined by a lower hub plate or disc 32, a flanged spacer 34 and a upper hub plate or a clamping plate 36. Both hub plates are secured, e.g. bolted to the flanged spacer. The outer peripheries of the lower hub plate and of the clamping plate include a plurality of radially protruding, circumferentially spaced apart teeth 38 for purposes further described below.

Securing to hub 30 is an innermost rotor ring assembly 40 which is clamped between lower hub plate 32 and clamping plate 36. The innermost rotor ring assembly has in its free end faces a plurality of grooves 42 which receives the peripheral teeth 38 of the hub plate and the clamping plate. The grooves are dimensioned so that they snugly engage the teeth for a play-free, concentric connection between the hub and the innermost ring assembly.

A plurality of outer rotor ring assemblies 44 are connected to and concentrically disposed about the innermost ring assembly in a manner more fully described below.

Each of the ring assemblies, both the innermost assembly and the outer assemblies, are constructed of at least two axially aligned rings 46 which have like inner and outer diameters and which are clamped together so that the opposing end faces 48 of the rings are in mutual engagement. As is apparent from FIG. 2 the rings of the innermost ring assembly 40 are clamped together by the hub plate 32 and the clamping plate 36 while the rings of the outer ring assemblies are clamped together with a plurality of circumferentially spaced apart, independent, U-shaped clamps 50 which have radially outwardly oriented lips 52 in engagement with free-end faces 54 of rings 46.

Each U-shaped clamp is defined by an axially oriented center portion 56 disposed in annular spaces 58 between adjacent ring assemblies and the above discussed pair of radially outwardly extending lips 52 which protrude perpendicularly from the ends of the center section. The center section has an arcuate outer surface 60 that defines a cylinder section of a diameter equal to the inner diameter of the ring assembly 40 located radially outward of the clamp. Consequently, when the rotor wheel of the present invention is spun at a high rate, centrifugal forces press the clamps intimately against the immediately adjacent outer ring assembly. The corresponding curvatures of the outer surface 60 of the clamp and the inner surface 62 of the ring assembly provide for a relatively large bearing surface and corresponding low bearing pressures between the clamp and the ring during operation of the rotor.

Clamp 50 also includes an integrally constructed plug member 64 defined by first and second radially inward and radially outward extending plug portions 66 and 68, respectively. The plug portions protrude perpendicularly from the center portion and they are located midway between lips 52. Each plug portion has a generally rectangular cross-section (which, for the purposes of this application includes a square cross-section) and is defined by opposing pairs of vertical side walls 70, 72 and contiguous and perpendicular horizontal surfaces 74 and 76, respectively. To lighten the clamp 50 and thereby reduce centrifugal forces which must be supported by the adjacent outer ring when the rotor is spun a bore 78 extends through the plug portions. The bore may be continuous, as illustrated in FIG. 6, or independent, blind holes may be formed in each plug portion (not illustrated in the drawings).

A plurality of circumferentially spaced apart, radially oriented grooves 80 are formed in opposing end faces 48 of the rings 46 which make up a ring assembly 44. The grooves are aligned so that they define between them radially oriented holes or apertures 82, 84 which are open in a radially outward and a radially inward direction, respectively, for receiving the inner and the outer plug portions 66 and 68, respectively. Each groove in the opposing end faces has a rectangular cross-section and a depth and width so that the apertures 82, 84 have a cross-section complementary to that of plug portions 66 and 68 for a snug, play-free fit between the apertures and the plug portions when the rotor is at rest.

The assembly, installation and operation of rotor 2 should now be apparent. To briefly summarize it, the rotor is assembled by first assembling the outermost ring assembly 44. This is done by placing the rings 46 forming the outermost assembly one on top of the other, aligning grooves 80 in the opposing ring end faces 48 and applying clamps 50 by inserting the outer plug portion 68 into the inwardly opening apertures 84. Clamp lips 52 thereby engage the free ring end faces 54 to secure both rings to each other.

The next adjacent ring assembly 44 is now assembled by aligning the outwardly opening grooves 80 in the opposing ring end faces thereof with the inner plug portions 66. The opposing end faces are brought together and a set of clamps is applied to this second ring assembly in the same manner in which the clamps were applied to the outermost ring assembly. This procedure is repeated until the innermost ring assembly 40 has been placed over the inner plug portions 66 of the innermost set of clamps 50. All rotor ring assemblies are now attached to hub 30 by engaging grooves 42 in the free-end faces of the innermost ring assembly 40 with the teeth 38 on hub disc 32 and clamping plate 36 and by bolting the disc and the plate to each other.

The assembly of rotor wheel 2 is now complete. It will be noted that the rings 46 of the innermost ring assembly are held together by hub 30 while the rings 46 of all outer ring assemblies 44 are held together by lips 52 of the clamp 50 positioned in the annular space 58 immediately inward of the respective assemblies. The precision fit between plug portions 66 and 68 and apertures 82 and 84 in the ring assemblies concentrically aligns the ring assemblies, supports all outer ring assemblies 44 from the innermost ring assembly 40 and, therewith, from hub 30, and further enables the transmission of torque between the ring assemblies so that the rotor wheel 2 can accelerate or decelerate for converting electrical energy into inertial energy or vice versa.

The installation of the rotor wheel 2 of the present invention is conventional and preferably so that the wheel rotates about a vertical axis as illustrated in FIG. 1.

In operation, that is, as the rate of rotation of wheel 2 increases, rings 46 (and therewith ring assemblies 40, 44) dilate as a function of the rate of rotation and their mean diameters. Consequently, each radially outer ring assembly dilated by an amount greater than its adjacent inner ring assembly. Since centrifugal forces press clamps 50 against the outer ring assembly the clamps move radially outward relative to the adjacent inner ring assembly by an amount equal to the differential dilation between the adjacent inner and outer ring assemblies.

The dilation of the ring assemblies in effect increases their diameter. As a result, the width of radial grooves 80 in the opposing end faces 48 of rings 46 also increases slightly. Since the plug portions 66, 68, and partially vertical side walls 72 and 74 (which are parallel to the axis of rotation of wheel 2) were in initial snug contact with the corresponding sides of apertures 82, 84 the dilation of the rings during operation causes a loss of this contact. A slight play therefore develops between the plug members and the corresponding apertures which is undesirable because it can cause vibrations during high speed operation.

Referring now also to FIG. 7, to counteract and limit the formation of such play between the plug members and the corresponding holes, the side walls 72 of the inner plug portions 66 diverge in a radial inward direction by an angle $\alpha$ as is illustrated (in a grossly exaggerated fashion) in FIG. 7. $\alpha$ is chosen so that the circumferential enlargement of the radially outwardly opening hole 82 to the enlarged opening represented by the dotted lines 82A is exactly compensated by the radially outward movement of clamp 50 with respect to the radially inner ring 46 to the position shown in dotted lines and identified 50A. It will be noted that the relatively larger dilation of the outer ring 46 to its dilated position 46A causes a slight withdrawal of the inner plug portion 66 from hole 82. As the inner plug portion is withdrawn from hole 82, however, its radially inwardly diverging sides 72 again snugly engage the vertical sides of the hole 82 to prevent the formation of any play between the inner plug portion and the hole in which it is disposed even though the width of the hole is enlarged from its width at rest.

Since there is no relative radial movement between the clamp 50 and the outer ring 46 a similar compensation of the slight enlargement of hole 84 which receives outer plug portion 68 is not possible. Thus, a slight amount of play can form between them during high speed operation of the wheel. However, the overall play resulting from the dilation of the rotor rings has been substantially reduced, by a factor of at least about 50%. This translates directly in a corresponding reduction of possible vibrations during the operation of the wheel.

The actual dimensioning of the holes, and in particular the selection of the angle $\alpha$ is well within the purview of those skilled in the art. The differential dilations of the rotor rings and the resulting circumferential expansion of the apertures 82 and the relative radial travel of the clamp 50 due to the differential dilation between the inner and the outer rotor rings can be calculated. From that angle $\alpha$ can be calculated or graphically determined with conventional grids and overlays.

I claim:

1. A rotor ring for use with an inertial energy storage wheel comprising: a plurality of coaxial rings having like inner and outer diameters, opposing faces of the rings including a plurality of circumferentially spaced apart, aligned grooves, each set of corresponding grooves defining a radially oriented, open hole; and a plurality of connecting members constraining the rings to each other, the members having a U-shaped configuration defined by a center section that is parallel to the axis of the rings and a pair of radially oriented lips disposed substantially perpendicular to the center section, the lips being spaced apart a distance substantially equal to the combined axial thickness of the rings, the member further including radially oriented plug means extending from the center section and having a configuration complementary to the holes; whereby the connecting members mutually align and constrain the rings to each other by inserting the plug means in the respective holes and engaging free end faces of the rings with the lips.

2. A rotor ring assembly according to claim 1 wherein the connecting members are distributed over an inside diameter of the rings.

3. A rotor ring assembly according to claim 2 wherein the hole and the plug means have a substantially constant cross-section over their common lengths.

4. A rotor ring assembly according to claim 2 wherein the plug means comprises a plug for each connecting member extending into the respective holes.

5. A rotor ring assembly according to claim 2 wherein the plug means of each connecting member comprises a pair of radially oriented plug portions extending in opposite directions from the center section of the connecting member, a first, radially outwardly extending plug portion of each connecting member being disposed in a hole.

6. A rotor ring assembly according to claim 5 wherein second, radially inwardly extending plug portions of the connecting members have a cross-section which increases in a radially inward direction.

7. A rotor ring assembly according to claim 6 wherein the increasing cross-section of the plug portions is defined by a substantially constant dimension parallel to the ring axis and a dimension in a direction perpendicular to the axis of the rings which increases in a radially inward direction over the length of the second plug portion.

8. A rotor ring assembly according to claim 6 wherein the second plug portion has a tapered configuration in a radial plane of the rings, and wherein sides of the second plug portion diverge in a radially inward direction.

9. A rotor ring assembly according to claim 8 including another plurality of axially aligned second rings, the second rings being disposed inward of the connecting members, opposing end faces of the rings including a plurality of aligned grooves defining radially inwardly extending apertures having a configuration complementary to that of the second plug portions, the second plug portions being disposed in the apertures, and means for constraining the second rings to each other.

10. A rotor ring assembly according to claim 9 wherein the plug members are provided with cutouts extending in the direction of the plug portions to lighten the connecting members.

11. A rotor ring assembly according to claim 10 wherein the center sections of the connecting members have a radially outwardly facing surface shaped complementarily to a radially inwardly facing surface of the rings, and wherein the outwardly facing surface of the center section is in intimate contact and supported by the inwardly facing surface of the rings.

12. A rotor ring assembly according to claim 9 wherein the second plug portions have a substantially rectangular cross-section defined by axially oriented, radially inwardly diverging side walls which are inclined with respect to each other by an angle alpha, and wherein the apertures have complementary, axially extending, radially inwardly diverging sides.

13. A rotor ring assembly according to claim 12 wherein the angle alpha is chosen so that the side walls, and the sides of the apertures remain in mutual contact when the rotor ring assembly is spun at a high rate, the outer plurality of rings dilates by an amount greater than the dilation of the second rings, and the connecting members move radially outward relative to the second rings by an amount equal to the differential dilation between the outer and the inner rings.

14. An inertial energy storage wheel comprising: a hub for rotation about its axis; a plurality of rotor ring assemblies, an innermost assembly being carried by the hub, the other assemblies being disposed radially outwardly of the innermost assembly; each of the other assemblies being defined by a plurality of like, axially aligned rings, opposing faces of each such plurality of rings having a plurality of circumferentially spaced apart, radially oriented, opposing grooves defining between them a like plurality of radially orineted holes; means for securing the rings of said innermost assembly to each other; clamp means constraining the rings of said other assemblies to each other for preventing relative axial movements between the rings of each assembly defined by a plurality of independent clamps disposed between each pair of adjacent assemblies, the clamps having a U-shaped configuration defined by an axially oriented center section and substantially perpendicular, spaced apart, ring engaging lips holding the rings of an assembly together; and radially oriented plugs for interconnecting adjacent ring assemblies and for transmitting torque between the assemblies, each plug being simultaneously disposed in a hole of adjacent ring assemblies.

15. An inertial energy storage wheel according to claim 14 wherein the lips extend radially outward of the center sections and engage the rings of the rotor ring assembly positioned radially outward of the center section.

16. An inertial energy storage wheel according to claim 14 wherein each plug engages and interconnects a pair of radially adjacent rotor ring assemblies.

17. An energy storage wheel according to claim 16 wherein each plug comprises a first, radially outward and a second, radially inward extending portion, the first portion having a substantially constant cross-over over its length and the second portion having a cross-section which is substantially constant over the length of the second portion in a direction parallel to the axis of the wheel and which increases in a radial plane in a radially inward direction, and wherein the first and second portions are disposed in correspondingly shaped holes of a radially outer and an adjacent, radially inner rotor ring assembly.

18. An inertial energy storage wheel constructed in accordance with claim 17 wherein the first and second portions of the plug have substantially rectangular cross-sections.

19. An inertial energy storage wheel according to claim 18 wherein the first and second portions of the plugs are connected to and protrude from the center section.

20. An inertial energy storage wheel comprising a hub for rotation about a vertical axis, the hub having a plurality of radially extending teeth disposed on its outer periphery;

a first rotor ring assembly defined by at least two like, axially aligned rings, at least one of the rings including means engaging the teeth of the hub for supporting the rings on the hub, centering the rings relative to the axis of rotation of the hub, and transmitting torque between the hub and the rings;

means for securing the rings to each other to maintain the rings in their axial alignment;

at least one second, outer rotor ring assembly disposed concentrically radially outward of the first assembly, the second assembly being defined by at least two axially aligned outer rings;

clamping means interposed between said first and second rotor ring assemblies for securing the rings of the second assembly to each other in an axially aligned relationship defined by a plurality of circumferentially spaced apart, U-shaped clamps disposed on a radially inner side of the second ring assembly and engaging free end faces of the rings;

means defining a plurality of circumferentially spaced, radially aligned, open holes in the first and in the second rotor ring assemblies; and torque transmitting bars disposed in the radially aligned holes for interconnecting the first and second ring assemblies and for accommodating differential relative dilations of the first and second rotor ring assemblies during high speed operation of the wheel, a first portion of each bar disposed in the first rotor ring assembly having a rectangular cross-section defined by a pair of horizontal sides and a pair of vertical sides which are parallel to the axis of rotation, the vertical sides diverging in a radially inward direction;

the hole in the first ring assembly having a configuration complementary to the configuration of the first bar portion and including a pair of vertically oriented side walls which are parallel to the axis of rotation;

the vertical sides and the side walls diverging in a radially inward direction at an angle chosen so that during a relative radial movement of the bar over a distance equal to the differential dilation between the first and second rings during high speed operation of the wheel results in a continued engagement of the vertical bar sides and the side walls.

21. An inertial energy storage wheel according to claim 20 wherein the bar includes a second, radially outwardly directed portion having a substantially constant, rectangular cross-section, and wherein the hole in the second ring assembly engaged by the second portion has a configuration complementary to that of the first portion.

22. An inertial energy storage wheel according to claim 21 wherein there is provided a plurality of U-shaped clamps equal to the plurality of torque transmitting bars, and wherein the clamps and the torque transmitting bars are integrally constructed.

23. An inertial energy storage wheel according to claim 22 wherein the first and second portions of the torsion bar are tubular.

* * * * *